E. M. GREEN.
RESILIENT VEHICLE TIRE.
APPLICATION FILED APR. 17, 1911.

1,030,809.

Patented June 25, 1912.

Witnesses
Jos. B. Conroy
A. Murray

Inventor
Era M. Green
By Shepherd & Campbell
Attorneys

COLUMBIA PLANOGRAPH CO., WASHINGTON, D. C.

UNITED STATES PATENT OFFICE.

ERA M. GREEN, OF SAN DIEGO, CALIFORNIA.

RESILIENT VEHICLE-TIRE.

1,030,809.

Specification of Letters Patent.

Patented June 25, 1912.

Application filed April 17, 1911. Serial No. 621,585.

*To all whom it may concern:*

Be it known that I, ERA M. GREEN, a citizen of the United States of America, residing at San Diego, in the county of San Diego and State of California, have invented certain new and useful Improvements in Resilient Vehicle-Tires, of which the following is a specification.

This invention relates to resilient vehicle tires and has for its object the provision of a device of this character consisting of a continuous, spirally wound, wire tire, together with improved means for holding the same upon a wheel rim.

A further object of the invention is the provision of a tire of the character set forth in which the convolutions of the wire are bent to interengage with each other to thereby form a matted structure.

A further object of the invention is the provision of a tire of the character indicated in which the convolutions are bent into small loops alternately at opposite sides of the tire to thereby increase the resiliency of the same.

Figure 1:
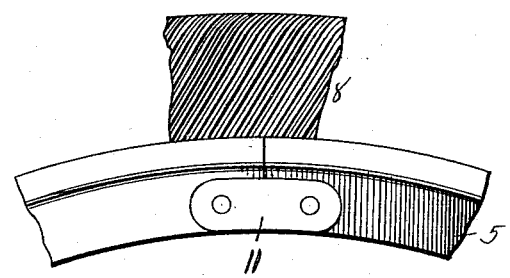
Figure 2:
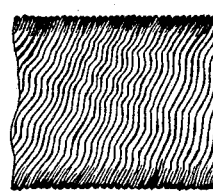
Figures 3, 6:
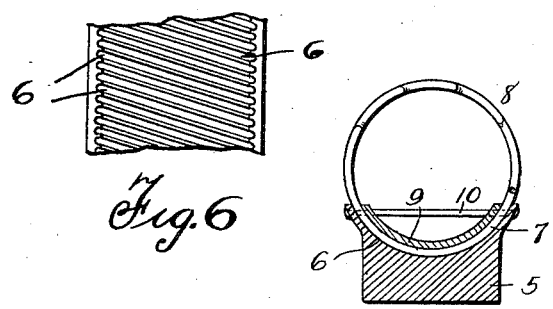
Figure 4:
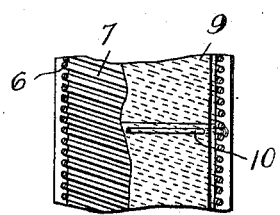
Figure 5:
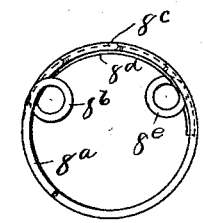

Further objects and advantages of the invention will be set forth in the detailed description which now follows:

In the accompanying drawing, Figure 1 is a view in side elevation of a portion of a tire and wheel rim constructed in accordance with the invention, Fig. 2 is a plan view of a portion of a tire showing the matted construction of the same, Fig. 3 is a detail transverse section of the same. Fig. 4 is a horizontal section illustrating a slightly modified form in which a continuous rim and a sectional clamping plate are employed. Fig. 5 is a detail view illustrating a modified form of the convolutions, and Fig. 6 is a detail top plan view of a section of the rim as shown in Fig. 4.

Like numerals designate corresponding parts in all of the figures of the drawing.

Referring to the drawing, the numeral 5 designates a wheel rim having a concave upper face, said face being diagonally grooved as at 6 for the reception of the base portions 7 of the convolutions 8 of wire which make up the tire. These base portions are clamped within the grooves 6 by an annular clamping plate 9, see Figs. 3 and 4, this clamping plate in turn being secured to the rim by transverse bolts 10 of which only one is shown.

The annular plate 9 may be made of a plurality of sections and the rim 5 may also be made of a plurality of sections and secured together by links 11 though when the rim is made in sections, the annular plate 9 will preferably be made in one piece and when the annular plate 9 is made in sections the rim will preferably be made in one piece.

In the structure shown in Fig. 4, the rim is in one piece and the clamping plate 9 is in sections, while in Fig. 1 the rim is shown as of sectional form. In Fig. 6 the form of clamping plate that will preferably be used with the sectional rim has been illustrated. In this case grooves $6^a$ are formed in the clamping plate instead of in the rim. Otherwise, the structure is the same as that previously described.

As is best illustrated in Fig. 2, those portions of the convolutions that form the tread of the wheel are made of zig-zag form and are interengaged with each other, whereby a matted construction is produced. By virtue of this construction, each convolution aids in supporting the others.

In the form of the device shown in Fig. 5, I have illustrated one convolution as beginning at $8^a$ and being bent to form a loop or smaller convolution at $8^b$. The convolution is then continued to complete it. The succeeding convolution $8^d$ is bent into a smaller loop $8^e$ at the opposite side of the tire, this structure providing additional resiliency as will be readily understood.

From the foregoing description, it will be seen that simple and efficient means are herein provided for accomplishing the objects of the invention, but while the elements shown and described are well adapted to serve the purposes for which they are intended, it is to be understood that the invention is not limited to the precise construction set forth, but includes within its purview such changes as may be made within the scope of the appended claim.

Having described my invention, what I claim is:

In a device of the character described the combination with a rim member of channel form having diagonally disposed grooves formed in its face, of a tire formed from a spirally wound wire, the thread portion of the spirals being of zigzag form and interengaged with each other, the inner portion of the spirals lying within the diagonal grooves of the rim, an angular clamping member, the inner face of which conforms to the curvature of the rim both longitudinally and transversely, said clamping member resting upon the inner portion of the said spirals and clamping them firmly into the diagonally extending grooves of the rim member, and a fastening device passing through both the rim member and the clamping member to bind these parts together, one of said members being formed of a plurality of curved sections.

In testimony whereof I affix my signature in presence of two witnesses.

ERA M. GREEN.

Witnesses:
K. W. HIZAR,
G. U. FRY.

Copies of this patent may be obtained for five cents each, by addressing the "Commissioner of Patents, Washington, D. C."